Aug. 4, 1925.
W. RAYMOND
1,548,098
CYLINDER RELIEF VALVE
Filed Jan. 2, 1925
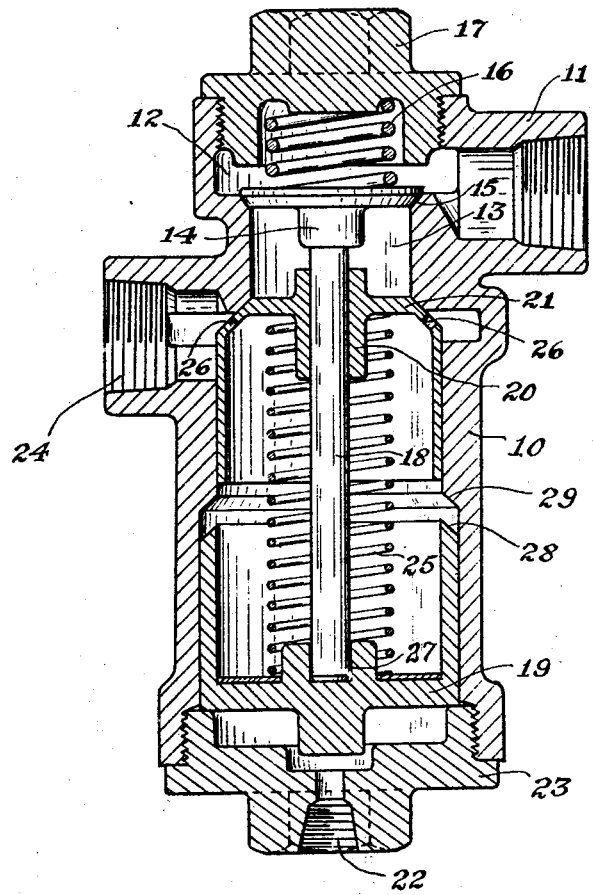
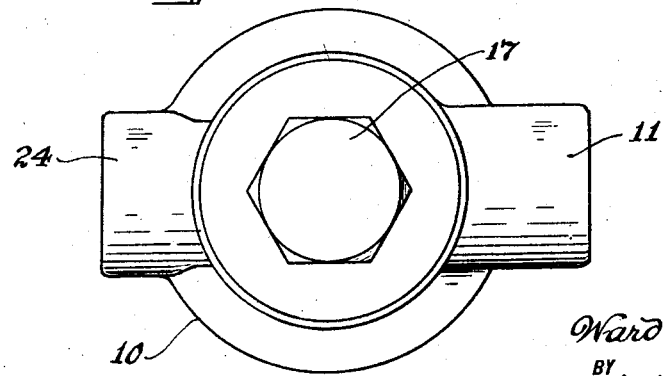
INVENTOR
Ward Raymond.
BY
Joseph H. Schofield
ATTORNEY Patented Aug. 4, 1925.

1,548,098

UNITED STATES PATENT OFFICE.

WARD RAYMOND, OF EASTON, PENNSYLVANIA, ASSIGNOR TO PENNSYLVANIA PUMP & COMPRESSOR COMPANY, OF EASTON, PENNSYLVANIA, A CORPORATION OF PENNSYLVANIA.

CYLINDER RELIEF VALVE.

Application filed January 2, 1925. Serial No. 53.

*To all whom it may concern:*

Be it known that I, WARD RAYMOND, a citizen of the United States, residing at Easton, in the county of Northampton and State of Pennsylvania, have invented certain new and useful Improvements in Cylinder Relief Valves, of which the following is a specification.

This invention relates to relief valves and in particular to a relief valve having automatic means for opening it and being of an improved and novel form.

It is an object of the present invention to provide an improved form of relief valve having a minimum clearance space, and when open, a wide valve opening for the fluid being ejected from the compressor cylinder.

It is another object of the invention to provide a poppet form of relief valve adapted to be actuated by a piston moved by suitable regulating means and having its stem passing centrally through and guided by the body portion of a second valve acting as a check valve.

Another object of the invention is to provide an improved, efficient but simple form of relief valve which will be rugged, compact and not easily put out of order. Further, it is an object to position the relief valve, the check valve and the piston for actuating the relief valve in alignment with each other, and each valve and the piston being movable longitudinally within the body member.

With the above and other objects in view, my invention consists in the features of construction and operation set forth in the following specification and illustrated in the accompanying drawing.

In the accompanying drawing annexed hereto and forming a part of this specification, I have shown my invention embodied in a relief valve for an air compressor, but it will be understood that the invention can be otherwise embodied and that the drawing is not to be construed as defining or limiting the scope of the invention, the claims appended to this specification being relief upon for that purpose.

In the drawings:

Figure 1 is a longitudinal sectional view of the complete valve made in accordance with the present invention, and Fig. 2 is a plan view of the same.

In the above drawing, I have shown but one form of the invention which is now deemed preferable, but it is to be understood that changes and modifications may be made within the scope of the appended claims without departing from the spirit of the invention.

Briefly, and in its broadest aspect, my invention comprises the following principal operative parts: first, a body member; second, a poppet valve therein having a stem extending centrally through the body member; third, a check valve opening oppositely to said poppet valve; fourth, a piston movable within the body member and having its movements controlled by fluid pressure supplied by a regulator or unloader, movement of this piston opening and closing the poppet valve.

Referring more in detail to the figures of the drawing, I provide a body member 10 having a connection 11 adapting it to be attached to a compressor cylinder. This connection 11 is adjacent an opening 12 to a valve chamber 13 in which a poppet valve 14 operates. A valve seat 15 is formed in the wall of the body member 10 against which the valve 14 rests during the normal operation of the compressor. To resiliently force the valve 14 against its seat 15 to retain it in closed position, a spring 16 is provided acting against the upper side of the valve 14. A recessed cap 17 threaded into the upper end of the body member 10 encloses the valve opening 12 and provides a suitable space for the spring 16.

The valve 14 is provided with an elongated stem 18 extending centrally and downward through the body member 10, its lower end resting in a socket 27 in a piston 19. In order to guide the valve 14, its stem 18 passes through a central hole provided in the hub 20 of the check valve 21 presently to be described. The valve 14 is therefore always guided accurately to its seat, as the lower end of the valve stem 18 is held central in socket 27 and the upper end is guided in the hub 20.

By means of an opening 22 provided centrally in a plug 23 closing the lower end of the body member 10 air under pressure may be admitted to the space below the piston 19 from a suitable regulator or unloader. In regulating devices of this general type, close fitting pistons and other moving parts are objectionable, as, if they are made close fitting enough to hold the air under pressure without material leakage, they are liable to get out of order and stick by failure of proper lubrication, warping out of shape, or by the entrance of particles of grit or dirt carried in by the air. To avoid this objection the piston 19 may be made to fit loosely within the body 10 and, at the top of the space within which the piston 19 operates, a bevelled valve seat 28 is formed. This valve seat 28 co-acts with a correspondingly bevelled valve surface 29 formed on the upper end of the piston 19. These two surfaces 28 and 29 may be ground to a pressure tight joint so that when the piston 19 is moved to its upper position by air through the opening 22 the leakage is but momentary during the movement upward of the piston 19. As soon as the piston 19 reaches its upper position no further leakage occurs, as the piston valve surface 29 is in contact with the valve seat 28. With air pressure admitted to this space the piston 19, which is preferably of much larger area than the valve 14, is elevated, thus forcing upward the stem 18 and lifting the valve 14 from its seat 15. By reason of the enlarged area of the piston 19 acted on by the discharge, pressure of the compressor is enabled to open the valve 14 against the pressure of spring 16 and against the pressure in the space 12, forcing the valve 14 toward its seat. The advantage of piston 19 being materially larger in area than valve 14 is that as equal pressures per unit area act upon both the valve 14 and the piston 19, the larger area of the piston 19 creates a greater total pressure on this piston and causes it to move upward promptly upon the admission of discharge pressure through the opening 22. Were the piston 19 of a diameter equal to that of the valve 14 the piston 19 would be raised only when the pressure above valve 14 is less than the discharge pressure, as during the suction stroke of the compressor. With the construction as shown, the piston 19 may be raised to unload the compressor at any point in the compressing stroke of the compressor. With valve 14 in its open position, fluid is permitted to pass from the compressor cylinder to which the body member 10 may be attached through the opening 12, the valve chamber 13, and finally through an opening to atmosphere 24. In passing through the chamber 13 the air opens the check valve 21 against the pressure of a light spring 25. Between each passage of air the check valve is closed tightly and quickly by the spring 25 so that no air or other fluid is permitted to pass in a retrograde manner past the check valve 14 through the opening 12 and into the cylinder of the compressor. To prevent pressure building up in the hollow portions of the check valve 21 and piston 19 within the body member 10, holes 26 are provided in the check valve 21. These at all times permit any leakage of air into the interior of the body member 10 passing out through the opening 24 into atmosphere.

As soon as the pressure is released below the piston 19, this piston is forced downward by spring 25, and simultaneously with this movement of the piston 19 the valve 14 is forced down against its seat 15 by the spring 16. As soon as valve 14 is again closed, normal operation of the compressor is resumed. It will be noted also that the check valve 21 may be loosely fitted in body 10, as the body portion of this valve acts only as a guide.

Throughout this construction therefore all moving parts are loosely fitted and the valves are of the annular or poppet type so that they may be quickly ground to pressure tight joints. This construction facilitates the manufacture of the component parts as they may be completely finished except upon their seats by automatic or production machines. Also when the valves become leaky they may be readily re-ground and do not require replacement of parts.

It will be understood that a relief valve will be provided at each end of a compressor cylinder, if double acting; and that, if desired, various modifications may be made in the details of construction. With the valves 14 and 21 and the piston 19 arranged longitudinally and centrally, the body member 10 is readily formed with the requisite cylindrical surfaces necessary for these parts, and within which they operate.

I claim:

1. A relief valve for compressors comprising in combination, a body member, a valve therein normally maintained closed, a valve stem on said valve extending longitudinally within the body member, a check valve adapted to open in the opposite direction from said first valve, independent means maintaining said valves closed, and pressure actuated means to open said first valve.

2. A relief valve for compressors comprising in combination, a body member, a valve therein means normally maintaining said valve closed, a valve stem on said valve extending longitudinally within the body member, a check valve oppositely disposed to said first valve and forming a guide for said valve stem, means normally holding said check valve closed, and pressure actuated means to open said first valve.

3. A relief valve for compressors comprising in combination, a body member, a valve therein normally maintained closed, a valve stem on said valve extending longitudinally within the body member, a check valve in alignment with said first valve and opposed thereto, said valve stem passing centrally through said check valve whereby it is guided by said check valve, a spring normally forcing said check valve to its closed position, and a piston engaging said valve stem whereby movement of said piston is adapted to open and close said first valve.

4. A relief valve for compressors comprising in combination, a body member, a valve therein normally maintained closed, a valve stem on said valve extending longitudinally within the body member, a check valve in alignment with said first valve and opposed thereto, a spring normally forcing said check valve to its closed position, said valve stem passing centrally through said check valve, and a piston aligned with the above said valves engaging said valve stem whereby movement of said piston is adapted to open and close said first valve.

5. A relief valve for compressors comprising in combination, a body member, a valve therein normally maintained closed, a valve stem on said valve extending longitudinally within the body member, a check valve in alignment with said first valve and opposed thereto, said valve stem passing centrally through said check valve whereby it is guided by said check valve, a spring normally forcing said check valve toward its closed position, a piston of larger area than said first valve and in alignment therewith, the lower end of the valve stem being engaged by said piston whereby movement of said piston will open and close said first valve, and means to admit fluid under pressure to actuate said piston.

6. A relief valve for compressors comprising in combination, a body member, a valve therein normally maintained closed, a piston within said body member, means to admit fluid under pressure to raise said piston to open said valve, a check valve in said body member adapted to open in a direction opposite to said first valve, a valve seat in said body member, and a valve surface on said piston adapted to contact with said valve seat in said body member when in its raised position.

7. A relief valve for compressors comprising in combination, a body member, a valve therein normally maintained closed and having a valve stem extending through said body member, a piston within said body member, means to admit fluid under pressure to raise said piston to open said valve, a check slidable on said valve stem, a valve seat in said body member, and an annular valve surface formed at the upper end of the piston and adapted to contact with said valve seat when the piston is in its raised position.

In testimony whereof, I hereto affix my signature.

WARD RAYMOND.